US 8,050,269 B2

(12) United States Patent  (10) Patent No.: US 8,050,269 B2
Kim  (45) Date of Patent: Nov. 1, 2011

(54) MOBILE TERMINAL AND MESSAGE TRANSMITTING/RECEIVING METHOD FOR ADAPTIVE CONVERGED IP MESSAGING

(75) Inventor: Song Kyoo Kim, Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 12/229,279

(22) Filed: Aug. 21, 2008

(65) Prior Publication Data

US 2009/0052455 A1  Feb. 26, 2009

(30) Foreign Application Priority Data

Aug. 22, 2007 (KR) .................. 10-2007-0084636

(51) Int. Cl.
*H04L 12/28* (2006.01)
(52) U.S. Cl. ........ 370/392; 370/310; 370/338; 370/352; 455/432.2
(58) Field of Classification Search .................. None
See application file for complete search history.

(56) References Cited

U.S. PATENT DOCUMENTS

| 5,826,023 | A | | 10/1998 | Hall et al. |
| 5,966,663 | A | * | 10/1999 | Gleason ............... 455/466 |
| 7,024,209 | B1 | | 4/2006 | Gress et al. |
| 2005/0233759 | A1 | * | 10/2005 | Anvekar et al. ....... 455/466 |

FOREIGN PATENT DOCUMENTS

| JP | 2002-038285 | 2/2002 |
| KR | 1020050076602 A | 7/2005 |
| KR | 1020050101924 A | 10/2005 |
| KR | 1020060006060 A | 1/2006 |
| KR | 1020060012736 A | 2/2006 |
| KR | 100661006 B1 | 12/2006 |

OTHER PUBLICATIONS

European Search Report dated Dec. 22, 2008 in connection with European Patent Application No. EP 08 16 2609.
"Converged IP Messaging Requirements" Draft Version 1.0, Aug. 16, 2007, Open Mobile Alliance, 67 pages.

* cited by examiner

*Primary Examiner* — Duc C Ho (57) ABSTRACT

A mobile terminal and message transmitting/receiving method are disclosed for adaptive converged IP messaging. The mobile terminal supporting converged IP messaging (CPM) converts a CPM message into an adaptive converged message and transmits the adaptive converged message. Upon reception, a received message is converted into a CPM message according to a message identifier.

20 Claims, 6 Drawing Sheets

MOBILE TERMINAL AND MESSAGE TRANSMITTING/RECEIVING METHOD FOR ADAPTIVE CONVERGED IP MESSAGING

CROSS-REFERENCE TO RELATED APPLICATION(S) AND CLAIM OF PRIORITY

This application claims priority to an application entitled "MOBILE TERMINAL AND MESSAGE TRANSMITTING/RECEIVING METHOD FOR ADAPTIVE CONVERGED IP MESSAGING" filed in the Korean Intellectual Property Office on Aug. 22, 2007 and assigned Serial No. 2007-0084636, the contents of which are incorporated herein by reference.

TECHNICAL FIELD OF THE INVENTION

The present invention relates generally to converged Internet protocol (IP) messaging and, more particularly, to a mobile terminal and message transmitting/receiving method for the same that convert messages to support converged IP messaging through existing networks.

BACKGROUND OF THE INVENTION

With recent advances in communication technologies, old communication systems and newly developed communication systems coexist in the same region or country. For example, in European countries, second generation GSM (global system for mobile communications) systems and third generation WCDMA (wideband code division multiple access) systems are used together. Mobile terminals used in a region where various communication systems coexist include a component usable in at least one communication system.

These mobile terminals are designed to receive various messaging services such as a short message service, multimedia message service and electronic mail service. To support various messaging services, existing communication network systems are equipped with separate servers corresponding to distinct messaging services. In other words, an existing communication network system has separate servers corresponding to distinct messaging services.

For more effective management of messaging servers, advanced communication network systems are starting to provide a converged IP messaging (CPM) service unifying various existing messaging services. A CPM service is a convergent service combining a short message service, multimedia message service and electronic mail service together. However, it is necessary to build a new communication network to provide this CPM service. That is, providing a new CPM service requires a new communication network.

Building new communication networks may require protocol changes and replacement of network facilities. However, it is very difficult to suddenly upgrade existing communication networks. Hence, it is inevitable that existing communication networks coexist with new communication networks. Accordingly, it is necessary to develop a technique enabling a CPM service in an environment where existing and new communication networks coexist.

SUMMARY OF THE INVENTION

To address the above-discussed deficiencies of the prior art, it is a primary object to provide a mobile terminal and message transmitting/receiving method that support adaptive converged IP messaging through various communication networks.

In accordance with an exemplary embodiment of the present invention, there is provided a mobile terminal for adaptive converged IP messaging, including: a message composer preparing message data corresponding to input signals; a display unit displaying the message data; a control unit setting a message attribute of the message data according to an input signal, and composing an adaptive converged message containing the message data and message attribute; a radio frequency unit transmitting the adaptive converged message to the outside; and an input unit generating an input signal and sending the input signal to the control unit.

In accordance with another exemplary embodiment of the present invention, there is provided a message transmitting method for adaptive converged IP messaging, including: activating a message composer; preparing message data corresponding to input signals using the message composer; setting a message attribute of the message data; composing an adaptive converged message containing the set message attribute and prepared message data; and transmitting the adaptive converged message to the outside.

In accordance with another exemplary embodiment of the present invention, there is provided a message receiving method for adaptive converged IP messaging, including: receiving a message; checking whether a message identifier indicating a message attribute is present in the received message; decoding the received message into a converged IP message depending upon the presence of the message identifier; and outputting the converged IP message.

In accordance with another exemplary embodiment of the present invention, there is provided a message transmitting/receiving method for adaptive converged IP messaging, including: activating a message composer; preparing message data corresponding to input signals using the message composer; setting a message attribute of the message data; composing an adaptive converged message containing the set message attribute and prepared message data; transmitting the adaptive converged message to the outside; receiving the adaptive converged message; decoding the received adaptive converged message into a converged IP message on the basis of a message identifier indicating a message attribute; and outputting the converged IP message.

In a feature of the present invention, a mobile terminal and message transmitting/receiving method for the same can provide an adaptive converged IP messaging service through various communication networks regardless of their types.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged Internet protocol (IP) messaging system.

In the description, communication systems may include a communication system supporting a converged IP messaging (CPM) service, and a communication system supporting separate messaging services. On the other hand, communication systems may include a second generation (2G) GSM network, enhanced second generation (2.5G) GSM network, 2.5G CDMA network, 3G UMTS network, 3G WCDMA network, other network, or a combination thereof. Such a network is generally known in the art, and an additional description thereof is omitted. The communication system of the present invention may be a communication system supporting heterogeneous messaging services through distinct servers or a communication system supporting a CPM service in an integrated manner.

The mobile terminal of the present invention is a terminal that can communicate with a communication system, may be a communication terminal operating according to at least one communication protocol related to International Mobile Telecommunications 2000 (IMT 2000), time division multiple access (TDMA), GSM, code division multiple access (CDMA), universal mobile telecommunications system (UMTS) and WCDMA, and may be any information and communication appliance or multimedia appliance capable of communicating with a base station, such as a portable multimedia player, MP3 player, digital broadcast receiver, personal digital assistant or smart phone.

Figure 1:
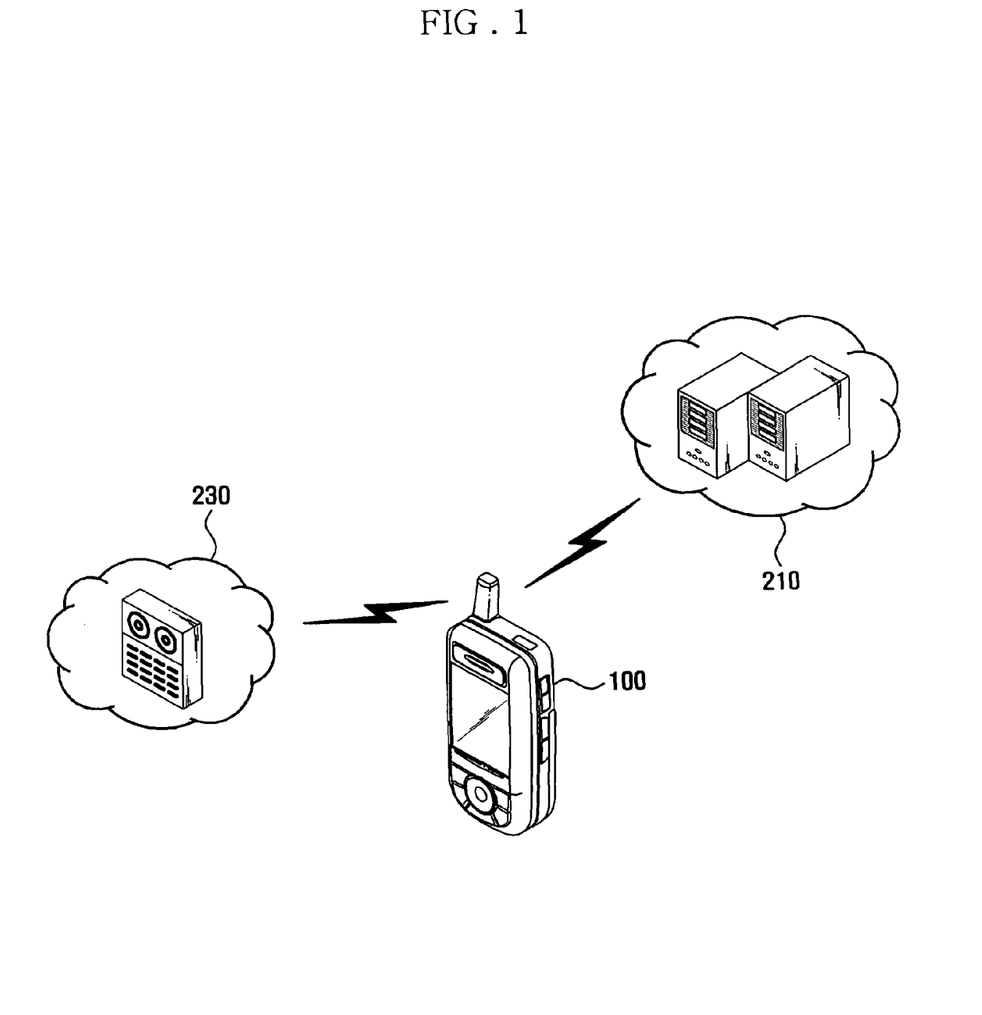
FIG. 1 is a block diagram illustrating a communication network system in accordance with the principles of the present invention.

FIG. 1 is a block diagram illustrating a communication network system supporting adaptive converged IP messaging (CPM) in accordance with the principles of the present invention.

Referring to FIG. 1, the communication network system includes a mobile terminal 100, a hybrid messaging service system 210 to provide various messaging services to the mobile terminal 100 through distinct servers, and a CPM communication system 230 to provide a converged messaging service to the mobile terminal 100.

The hybrid messaging service system 210 is a communication network, which delivers various messaging services, such as a short message service, multimedia message service and electronic mail service, though different servers. Thereto, the hybrid messaging service system 210 may include message service centers and e-mail servers. The hybrid messaging service system 210 delivers messages between mobile terminals using these message service centers and servers. Preferably, the hybrid messaging service system 210 supports protocols necessary to deliver different types of messages. For example, the hybrid messaging service system 210 may support the session initiation protocol (SIP) and IP protocol to deliver an e-mail messaging service, and a circuit-associated protocol to deliver a short message service.

The CPM communication system 230 is a communication system, which delivers a converged messaging service to the mobile terminal 100. The CPM communication system 230 supports a protocol necessary to deliver a converged messaging service. That is, the CPM communication system 230 may support the SIP protocol or IP protocol to exchange converged messages between mobile terminals. The CPM communication system 230 includes a consolidated server to support a short message service, multimedia message service and electronic mail service in an integrated manner.

The mobile terminal 100 sends and receives messages to and from other mobile terminals through the hybrid messaging service system 210 and CPM communication system 230. Thereto, the mobile terminal 100 preferably provides a means to compose messages processable by both the hybrid messaging service system 210 and CPM communication system 230. That is, the mobile terminal 100 converts a received message into a usable form according to the attribute thereof for message display, and converts a message to be sent into a transmittable form regardless of the attribute thereof for transmission. The mobile terminal 100 is described in more detail in connection with FIG. 2.

Figure 2:
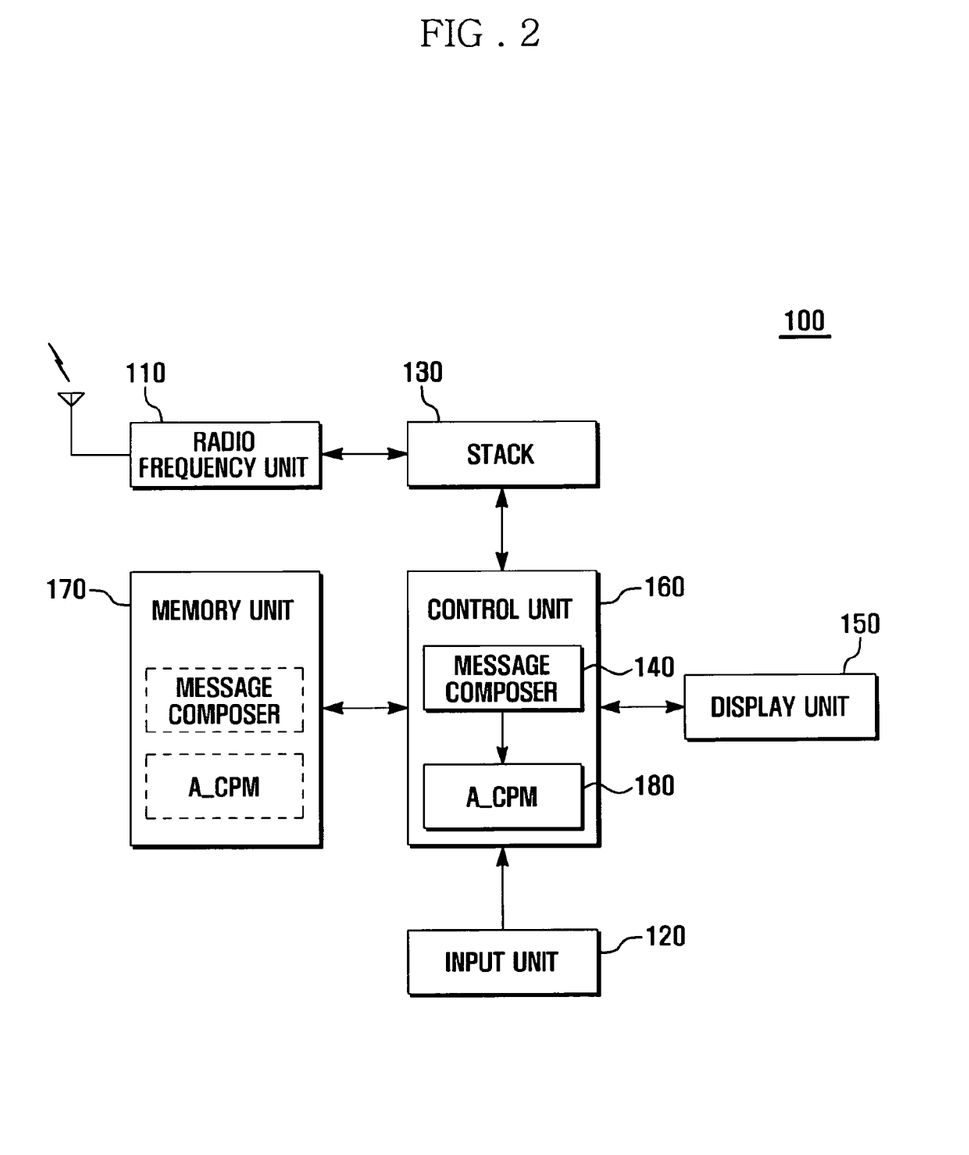
FIG. 2 is a block diagram illustrating a mobile terminal according to an exemplary embodiment of the present invention.

FIG. 2 is a block diagram illustrating the mobile terminal 100 according to an exemplary embodiment of the present invention.

Referring to FIG. 2, the mobile terminal 100 includes a radio frequency unit 110, input unit 120, stack 130, display unit 150, memory unit 170, and control unit 160.

The radio frequency unit 110 places and receives a call under the control of the control unit 160. The radio frequency unit 110 may include a radio frequency transmitter for upconverting the frequency of a signal to be transmitted and amplifying the signal, and a radio frequency receiver for low-noise amplifying a received signal and downconverting the frequency of the received signal.

In particular, the radio frequency unit 110 establishes a communication channel to the hybrid messaging service system 210 and CPM communication system 230, and sends and receives a message through the communication channel under the control of the control unit 160.

The input unit 120 includes a plurality of alphanumeric and function keys for inputting alphanumeric information and for setting various functions. The function keys may include direction, side, and shortcut keys associated with corresponding functions. The input unit 120 transmits key signals from the user for setting and controlling the mobile terminal 100 to the control unit 160.

In particular, the input unit 120 generates signals related to message composition. That is, the input unit 120 generates an input signal for activating a message composition window, an input signal for inputting a character, number and emoticon to the message composition window, and an input signal for sending the composed message, and sends the generated signals to the control unit 160.

The stack 130 temporarily stores a message received by the radio frequency unit 110, and a message to be transmitted through the radio frequency unit 110. The stack 130 may store messages received or to be sent in separate regions according to their types.

The display unit 150 provides a screen interface for the use of the mobile terminal 100 in relation to message composition, waiting, message reception, and calling. The display unit 150 may include a panel of liquid crystal display (LCD) devices, LCD controller, and memory device for storing image data to be displayed. If the panel has a touch screen capability, the display unit 150 can also act as an input means.

The display unit 150 can display a message composition window to compose an adaptive converged message. The message composition window enables composition of a short text message, multimedia message, e-mail message, and CPM formatted message in an integrated manner. Properties of the message composition window are determined by the attribute of a composed message and properties of a connection channel for message transmission and reception. In the message composition window, the attribute of a message can be set according to selection of a composition mode through a menu option, or be set according to selection of a composition mode after message composition. The message composition window supports composition of various messages including a short text message, multimedia message, e-mail message, and CPM formatted message. In the message composition window, when a message being composed includes only short texts, the composition mode may be set to support short text messaging or e-mail messaging; and when the message being composed includes an image or audio, the composition mode may be set to support multimedia messaging or e-mail messaging. When the mobile terminal 100 establishes a messenger channel to another mobile terminal, the message composed using the message composition window can be transmitted through an instant messaging service.

In addition, when a message is received, the display unit 150 can check the attribute of the received message (i.e., a short text message, multimedia message, e-mail message, and CPM formatted message) to display the received message according to the attribute thereof. At this time, if the received message contains an image or audio file, the control unit 160 can control a suitable element such as an audio processor to handle the received message.

The memory unit 170 stores application programs to implement functions of the present embodiment, and applications to compose, receive, and display messages. The memory unit 170 may include a program storage section and a data storage section.

The program storage section stores an operating system for booting the mobile terminal 100, message application programs for handling messages, and application programs for supplementary functions related to playback of audio and video data. In particular, the message application programs in the program storage section include an adaptive CPM module (A_CPM) 180, which supports handling of messages received from the hybrid messaging service system 210 and CPM communication system 230. The adaptive CPM module 180 can be stored in the memory unit 170, and loaded and activated under the control of the control unit 160. The message application programs further include a message composer 140, which supports composition of various messages in collaboration with the adaptive CPM module 180. That is, the message composer 140 is used to compose a short text message, multimedia message, e-mail message, and CPM formatted message that are processable by the adaptive CPM module 180.

The data storage section stores data generated from the use of the mobile terminal 100. For example, the data storage section stores a message being composed or completed in response to a user input, and a message received from the outside. The data storage section may store user data related to supplementary functions such as audios, phonebooks and digital contents, and store information on the user data. A portion of the data storage section may be allocated to the stack 130.

The control unit 160 controls the elements of the mobile terminal 100, and signal exchange between the elements. The control unit 160 activates the message composer 140 and adaptive CPM module 180 to change the format of a received message in response to an input signal from the input unit 120. To be more specific, in response to a message composition request from the input unit 120, the control unit 160 activates the message composer 140 and adaptive CPM module 180, and controls the display unit 150 to display a character, number, and file corresponding to input signals. The control unit 160 controls the adaptive CPM module 180 to convert a CPM formatted message composed by the message composer 140. That is, the control unit 160 converts the format of a CPM formatted message so that a mobile terminal not supporting CPM messaging can extract message contents. The control unit 160 controls the radio frequency unit 110 to send the format-converted message to another mobile terminal. Upon reception of a message, the control unit 160 checks the attribute of the received message. Thereto, a message preferably includes a message identifier indicating the attribute of the message. The attribute of a message can be related to the message format selected during message composition and processability by a particular protocol. The message attribute may indicate a short text message, multimedia message, e-mail message, or CPM formatted message. After message attribute determination, the control unit 160 converts the received message into a message with an attribute format supported by the mobile terminal 100. For example, when the mobile terminal 100 is a terminal supporting CPM messaging and receives a short text message or multimedia message, the control unit 160 controls the adaptive CPM module 180 to convert the received message into a CPM formatted message. Then, the control unit 160 controls the display unit 150 to display the converted CPM formatted message. With this process, the mobile terminal 100 supporting CPM messaging can send, receive, and process messages regardless of their types.

Figure 3:
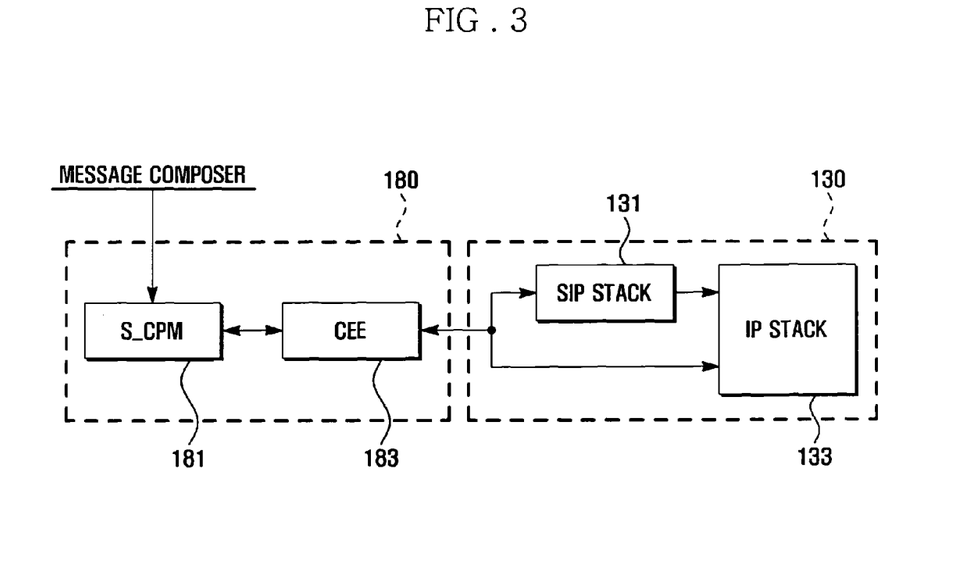
FIG. 3 is a detailed block diagram of an adaptive CPM module and stack in the mobile terminal of FIG. 2.

FIG. 3 is a detailed block diagram of the adaptive CPM module 180 and stack 130 in the mobile terminal 100.

Referring to FIG. 3, the adaptive CPM module 180 includes a CPM client (S_CPM) 181 and client extension engine (CEE) 183, and the stack 130 includes a SIP stack 131 and IP stack 133.

The CPM client 181 is a messaging client supporting the process of composition, transmission, storage and reception of messages, which is a main feature of a messaging service. That is, when the message composer 140 is activated, the CPM client 181 supports transmission and storage of a message composed by the message composer 140, and reception of a message. The CPM client 181 can create a message identifier indicating the attribute of a message composed by the message composer 140 (short text message, multimedia message, or CPM formatted message), and send the created message identifier to the client extension engine 183.

The client extension engine 183 encodes a message (CPM formatted message) composed by the CPM client 181 and message composer 140 and a message identifier into an adaptive converged message. The client extension engine 183 determines whether a received message is a regular message or adaptive converged message, and converts the received message into a CPM formatted message by decoding the received message with or without message identifier checking. That is, the client extension engine 183 converts a CPM formatted message into an adaptive converged message, and converts a received message into a CPM formatted message. Encoding and decoding is described in more detail in connection with FIGS. 4A and 4B.

The SIP stack 131 buffers a message when the message is transmitted using the SIP protocol. That is, a composed message to be transmitted using the SIP protocol is first stored in the SIP stack 131, processed by the SIP protocol, and forwarded to the radio frequency unit 110 through the IP stack 133.

The IP stack 133 is an area for temporarily storing a message when the message is transmitted from the client extension engine 183 using the IP protocol. For a received IP message, the IP stack 133 can temporarily store the message, remove the IP header from the message, and forward the message body to the SIP stack 131 if the body is based on SIP.

Figure 4A:
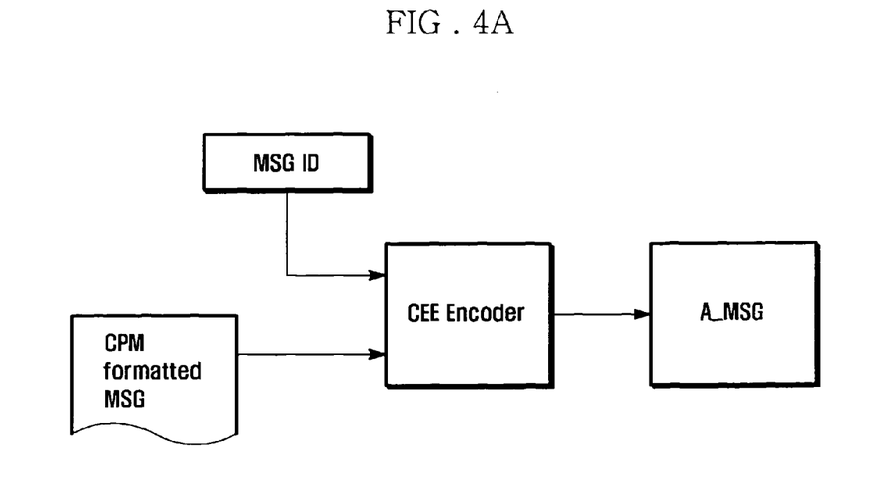
FIGS. 4A and 4B are block diagrams illustrating message encoding and message decoding, respectively.
Figure 4B:
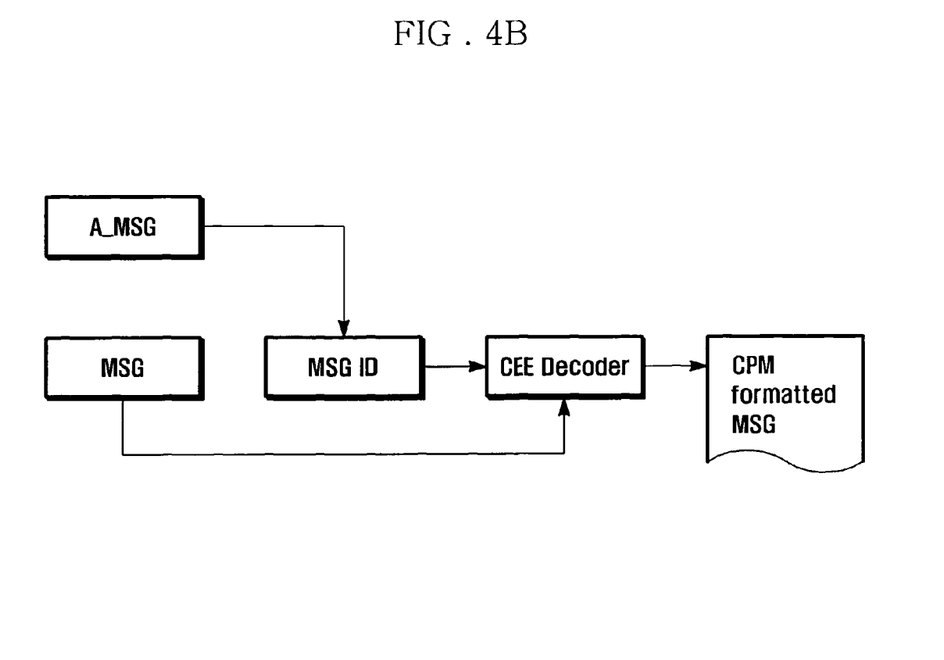

FIG. 4A is a block diagram of message encoding by a client extension engine encoder, and FIG. 4B is a block diagram of message decoding by a client extension engine decoder.

Referring to FIG. 4A, in message encoding, the client extension engine encoder (CEE encoder) encodes an adaptive converged message (A_MSG) from a CPM formatted message composed by the message composer 140 and a message identifier (MSG ID) of the CPM formatted message set by mode selection during or after message composition. The message identifier indicates the type of a CPM formatted message. For example, message identifiers of '0', '1', '5' and '9' may be defined to indicate a CPM formatted message, multimedia message, instant message and short text message, respectively. The message identifier can be set by the user, or automatically set according to attributes of a corresponding message. For example, when a message composed by the message composer 140 includes only short texts, the message identifier thereof can be set to indicate a short text message; and when a composed message includes a short text and an image or audio file, the message identifier thereof can be set to indicate a multimedia message. Here, the message identifier may be further set by the user to indicate an e-mail message or instant message.

Referring to FIG. 4B, in message decoding, when a message is received, the control unit 160 determines whether to directly forward the received message to the client extension engine decoder (CEE decoder). That is, when a regular message (MSG) or adaptive converged message (A_MSG) is received, the mobile terminal 100 directs the client extension engine decoder to decode the received message depending upon the presence of a message identifier (MSG ID). In other words, when a regular message (MSG) without a message identifier is received, the client extension engine decoder extracts and decodes the body part of the regular message. At this time, the client extension engine decoder can convert the regular message into a CPM formatted message. When an adaptive converged message is received, the client extension engine decoder directly decodes the received message into a CPM formatted message. On the other hand, when the mobile terminal 100 not supporting CPM messaging receives an adaptive converged message, it can extract and decode the body of the received adaptive converged message regardless of the message identifier. Thereto, preferably, the adaptive converged message, which is transmitted and received as an IP packet, has a format as illustrated in FIG. 5.

Figure 5:
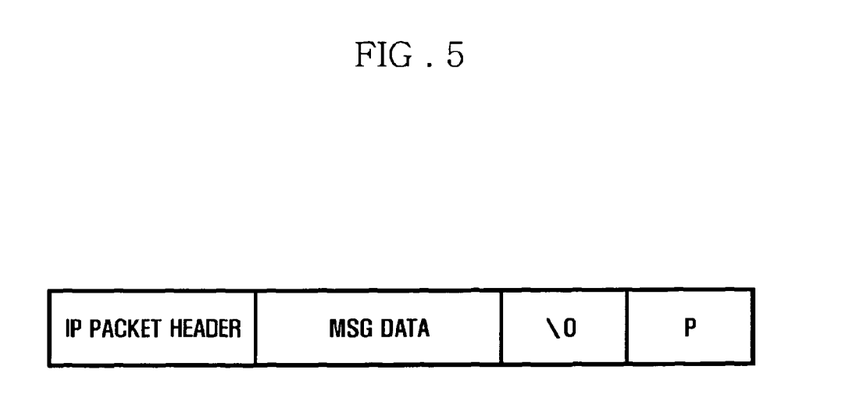
FIG. 5 illustrates the format of an IP packet.

Referring to FIG. 5, an IP packet of the present invention includes fields for an IP header, message data, null symbol (\0), and message identifier (P). The IP header is the header of the IP packet, and contains packet information such as the type and size of data in the packet. The message data contains the body of a message composed by the message composer 140, and may include short text data, image data and audio data. The null symbol indicates the end of the message data, and is a delimiter separating the message data from the subsequent message identifier. Although the null symbol is used as a delimiter separating the message data from the message identifier, the IP packet is not limited by the null symbol. That is, the IP packet of the present invention includes an IP header, message data, and message identifier, and the message data and message identifier are set to be distinguished from each other.

The IP packet can be encoded and decoded by the client extension engine 183, and can also be decoded by a mobile terminal not supporting CPM messaging. That is, when a mobile terminal not supporting CPM messaging receives such an IP packet, it extracts and decodes only the message data prior to the null symbol in the received IP packet for output, and ignores the message identifier after the null symbol.

As described above, a mobile terminal according to an embodiment of the present invention enables composition of a CPM formatted message using a message composer supporting a CPM service, creation of an adaptive converged message using a message identifier, and transmission of the created adaptive converged message. The adaptive converged message can be decoded by both a mobile terminal supporting CPM messaging and a mobile terminal not supporting CPM messaging. When an adaptive converged message or a regular message is received, a mobile terminal supporting CPM messaging can decode the received message using the client extension engine 183 regardless of the message type.

Hereinabove, the mobile terminal supporting adaptive converged IP messaging is described. Next, a message transmitting/receiving method for the mobile terminal is described.

Figure 6:
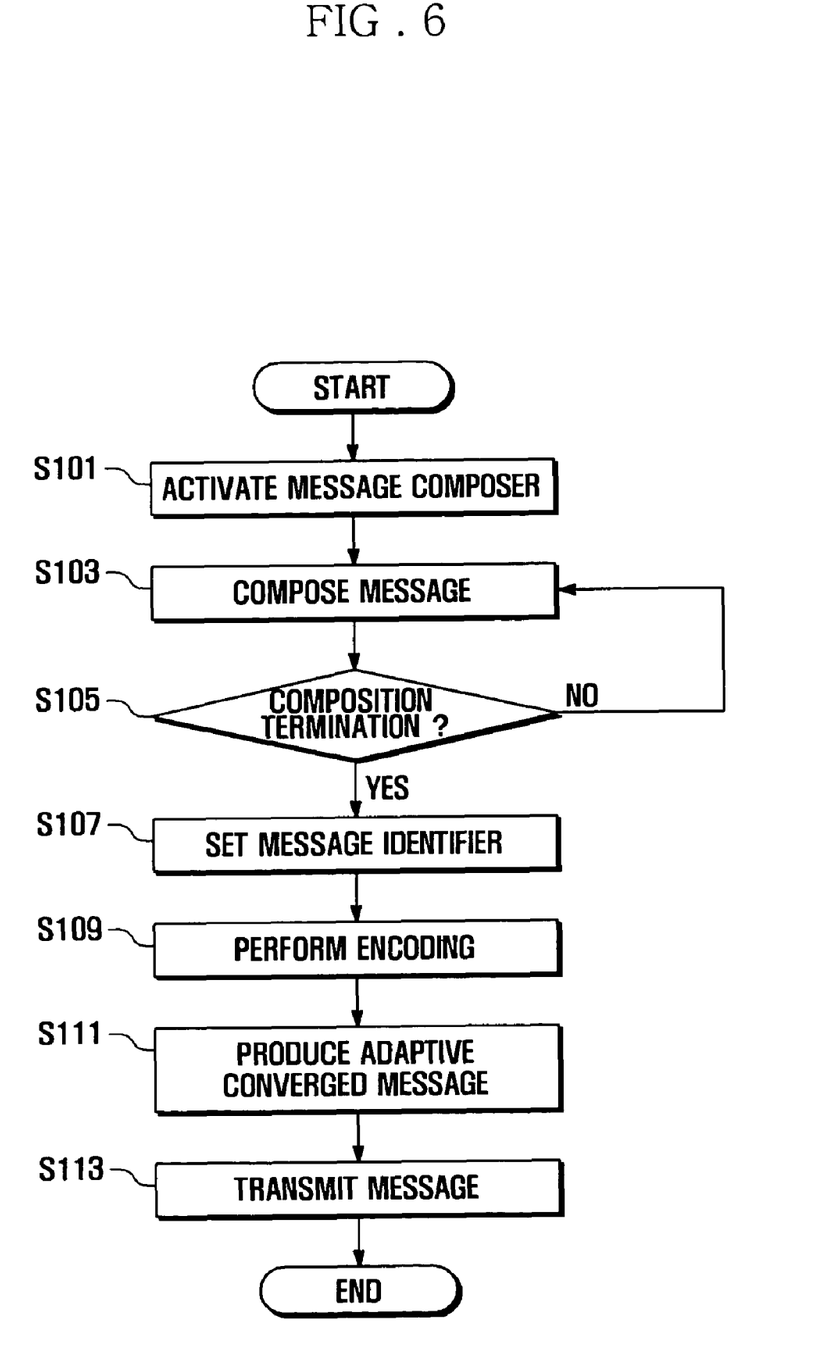
FIG. 6 is a flow chart illustrating a message transmitting method according to another exemplary embodiment of the present invention.

FIG. 6 is a flow chart illustrating a message transmitting method for the mobile terminal 100 supporting adaptive converged IP messaging according to another exemplary embodiment of the present invention.

Referring to FIG. 6, the control unit 160 of the mobile terminal 100 activates the message composer 140 in response to an input signal from the input unit 120 (S101). The message composer 140 is a message writing tool for a mobile terminal supporting CPM messaging, and a message composed thereby can be a CPM formatted message. The CPM formatted message is compliant with the CPM service standard of Open Mobile Alliance (OMA).

Thereafter, the control unit 160 controls the message composer 140 to compose a message corresponding to input signals (S103). When the user inputs characters and numbers or selects a file of a still image, moving image or audio for input, the control unit 160 forwards the user inputs to the message composer 140, which then composes a message using the user inputs. At this time, the control unit 160 preferably controls the display unit 150 to display the message being composed for user viewing.

The control unit 160 checks whether a composition termination request is issued (S105). If a composition termination request is not issued, the control unit 160 continues message composition. If a composition termination request is issued, the control unit 160 terminates message composition and sets a message identifier (S107). That is, the control unit 160 sets a message identifier indicating the attribute of the composed message according to user input signals. The control unit 160 may also automatically set the message identifier by examining properties of materials constituting the message such as a text, image and audio file. The control unit 160 may automatically set the message identifier according to the current communication channel in use (for example, a traffic channel for a short text message, SIP-based channel for an instant message, or IP-based channel for a multimedia message). The user may set the message identifier according to the composition mode for a short text message, multimedia message, e-mail message, or CPM formatted message. Preferably, for message handling using the message identifier, settings of the message identifier are distributed among mobile terminals exchanging messages in advance.

After setting the message identifier, the control unit 160 performs an encoding operation on the composed CPM formatted message and the message identifier (S109) to produce an adaptive converged message (S111). The adaptive converged message includes an IP packet header, message data, and message identifier, and may further include a symbol such as a null symbol between the message data and message identifier for separation. When a mobile terminal not supporting CPM messaging receives such an adaptive converged message, it can extract only the message data prior to the null symbol in the received message, ignoring data after the null symbol, and decode the extracted message data. When a mobile terminal supporting CPM messaging receives such an adaptive converged message, it can convert the received adaptive converged message into a CPM formatted message using the message identifier and the client extension engine 183. The CPM formatted message is a message that can be output through the display unit 150 of a mobile terminal supporting CPM messaging.

Finally, the control unit 160 transmits the adaptive converged message to the outside, namely, another mobile terminal (S113).

As described above, in the message transmitting method, an adaptive converged message with a message identifier is composed and transmitted so that the message can be received and decoded by any type of mobile terminal.

Figure 7:
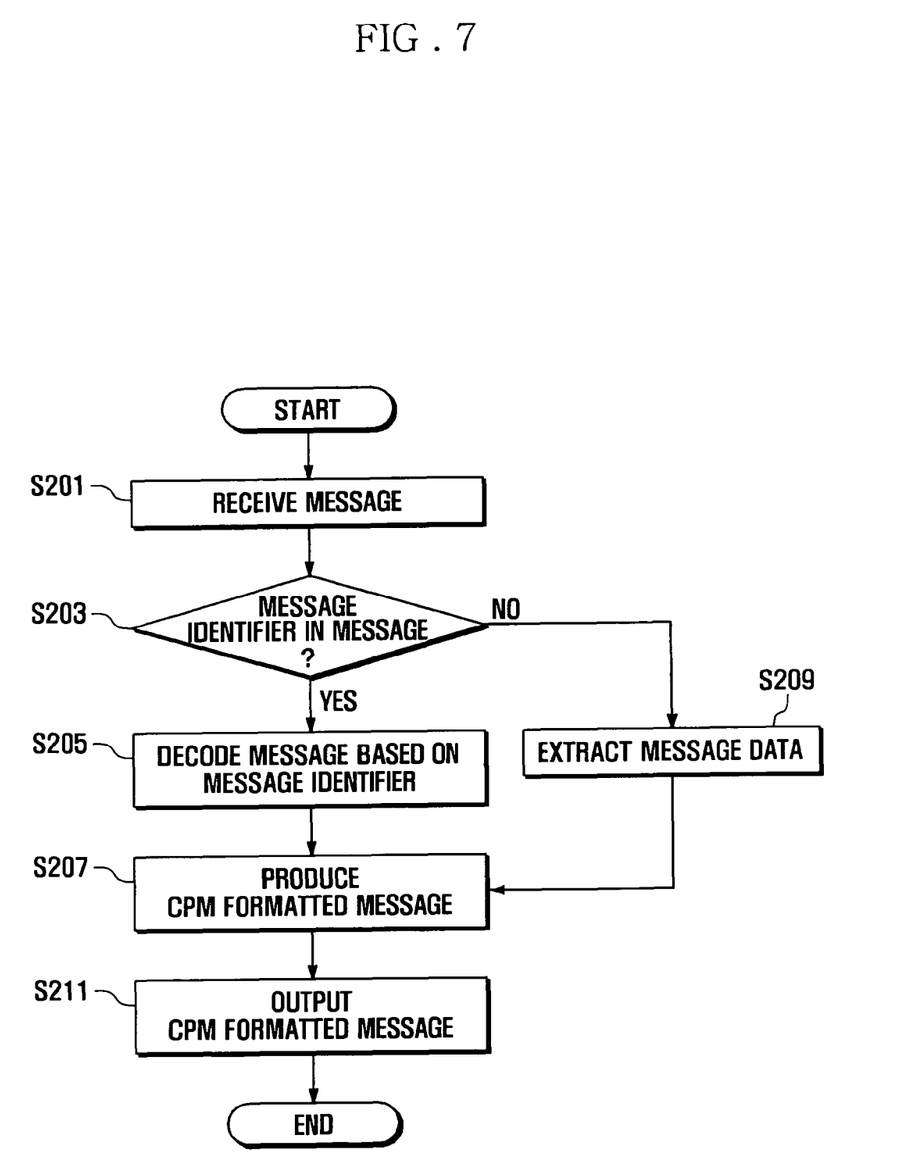
FIG. 7 is a flow chart illustrating a message receiving method according to another exemplary embodiment of the present invention.

FIG. 7 is a flow chart illustrating a message receiving method for the mobile terminal 100 supporting adaptive converged IP messaging according to another exemplary embodiment of the present invention.

Referring to FIG. 7, when the mobile terminal 100 receives a message (S201), the control unit 160 checks whether a message identifier is present in the received message (S203). A message having a message identifier is an adaptive converged message.

If a message identifier is present in the received message, the control unit 160 performs decoding on the basis of the message identifier (S205). That is, the control unit 160 extracts the message identifier and message data from the received message stored in the stack 130, and forwards the extracted message identifier and message data to the client extension engine 183. The client extension engine 183 produces a CPM formatted message using the message identifier and message data (S207).

If a message identifier is not present in the received message, the control unit 160 extracts message data from the received message (S209). The control unit 160 produces a CPM formatted message using the extracted message data only (S207). Thereto, the control unit 160 collects information regarding the extracted message data and currently formed communication channels of the mobile terminal 100, and determines the attribute of the message data on the basis of the collected information. That is, the control unit 160 determines whether the received message is a short text message, multimedia message, e-mail message or instant message on the basis of the file information in the message data and current channel information. Thereafter, the control unit 160 produces a CPM formatted message using the message type or property and message data (S207). The control unit 160 controls the display unit 150 and an audio processor to output the CPM formatted message (S211).

As described above, in the message receiving method, a received message regardless of its type is converted into a CPM formatted message for subsequent use. Hence, the mobile terminal 100 supporting CPM messaging can perform message handling regardless of message properties.

In the case where the mobile terminal 100 does not support CPM messaging, upon reception of a message as an IP packet, the mobile terminal 100 can extract and decode only the message data in the received IP packet regardless of the presence of a message identifier.

As apparent from the above description, in the present invention, an adaptive converged message is composed and transmitted through a communication network not supporting CPM messaging, enabling message transmission, reception, and processing regardless of terminal properties. That is, the mobile terminal and message transmitting/receiving method for adaptive converged IP messaging convert attributes of messages so that the messages can be transmitted and received through various communication networks regardless of network types. Accordingly, the present invention enables support of various messaging services through various communication networks.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A message transmitting method for adaptive converged Internet protocol (IP) messaging, the method comprising:
generating a message data corresponding to an input signal using a message composer;
setting a message attribute of the message data;
generating an adaptive converged message containing the message attribute and the message data; and
transmitting the adaptive converged message,
wherein the message data of the adaptive converged message is decodable by mobile terminals that support converged Internet protocol (IP) messaging and is decodable by mobile terminals that do not support converged Internet protocol (IP) messaging.

2. The message transmitting method of claim 1, wherein setting a message attribute comprises one of:
setting the message attribute to a value indicating a converged IP message;
setting the message attribute to a value indicating a multimedia message;

setting the message attribute to a value indicating a short text message;
setting the message attribute to a value indicating an electronic mail message; and
setting the message attribute to a value indicating an instant message.

3. The message transmitting method of claim 1, wherein the adaptive converged message comprises an IP packet header, the message data, and a message identifier corresponding to the message attribute.

4. The message transmitting method of claim 3, wherein the adaptive converged message further comprises a delimiter symbol separating the message data from the message identifier.

5. The message transmitting method of claim 1, further comprising encoding the adaptive converged message.

6. A message receiving method for adaptive converged Internet protocol (IP) messaging, the method comprising:
receiving a message at a mobile terminal;
determining whether a message identifier indicating a message attribute is present in the received message;
decoding the received message into a converged IP message depending upon a presence of the message identifier; and
outputting to display at least a portion of the converged IP message.

7. The message receiving method of claim 6, wherein decoding the received message into a converged IP message comprises:
extracting, when the message identifier indicates one of a short text message, a multimedia message, an electronic mail message and an instant message, a message data from the received message; and
converting the extracted message data into a converged IP message.

8. The message receiving method of claim 6, wherein decoding the received message into a converged IP message comprises:
extracting, when the message identifier is not present, a message data from the received message; and
converting the extracted message data into a converged IP message.

9. The message receiving method of claim 6, wherein the message attribute comprises one of:
a value indicating a converged IP message;
a value indicating a multimedia message;
a value indicating a short text message;
a value indicating an electronic mail message; and
a value indicating an instant message.

10. The message receiving method of claim 6, wherein the received message is an adaptive converged message that is decodable by mobile terminals that support converged Internet protocol (IP) messaging and is decodable by mobile terminals that do not support converged Internet protocol (IP) messaging.

11. A method for adaptive converged Internet protocol (IP) messaging, the method comprising:
receiving an adaptive converged message at a mobile terminal;
decoding the received adaptive converged message into a converged IP message on the basis of a message identifier in the received adaptive converged message indicating a message attribute; and
outputting to display at least a portion of the converged IP message.

12. Method of claim 11, wherein the message attribute comprises one of:
a value indicating a converged IP message;
a value indicating a multimedia message;
a value indicating a short text message;
a value indicating an electronic mail message; and
a value indicating an instant message.

13. The method of claim 11, wherein the adaptive converged message comprises an IP packet header, the message data, a message identifier corresponding to the message attribute, and a delimiter symbol separating the message data from the message identifier.

14. The method of claim 11, wherein decoding the received adaptive converged message comprises:
extracting, when the message identifier indicates one of a short text message, a multimedia message, an electronic mail message and an instant message, a message data from the received adaptive converged message; and
converting the extracted message data into the converged IP message.

15. The method of claim 11, wherein decoding the received adaptive converged message comprises:
extracting, when the message identifier is not present, a message data from the received adaptive converged message; and
converting the extracted message data into the converged IP message.

16. A mobile terminal for adaptive converged Internet protocol (IP) messaging, the mobile terminal comprising:
a message composer configured to generate a message data corresponding to an input signal;
a display unit configured to display the message data;
a control unit configured to set a message attribute of the message data according to the input signal, and configured to generate an adaptive converged message containing the message data and the message attribute; and
a radio frequency unit configured to transmit the adaptive converged-message,
wherein the message data of the adaptive converged message is decodable by mobile terminals that support converged Internet protocol (IP) messaging and is decodable by mobile terminals that do not support converged Internet protocol (IP) messaging.

17. The mobile terminal of claim 16, wherein the control unit comprises:
a converged IP messaging client configured to control transmission and storage of the adaptive converged message; and
a client extension engine configured to encode and decode the adaptive converged message.

18. The mobile terminal of claim 17, wherein the client extension engine comprises:
a client extension engine encoder configured to generate the adaptive converged message using the message data and a message identifier corresponding to the message attribute; and
a client extension engine decoder configured to decode a received message into a converged IP message.

19. The mobile terminal of claim 16, wherein the adaptive converged message comprises an IP packet header, the message data, a message identifier corresponding to the message attribute, and a delimiter symbol separating the message data from the message identifier.

20. The mobile terminal of claim 16, wherein the message attribute comprises one of:
a value indicating a converged IP message;
a value indicating a multimedia message;
a value indicating a short text message;
a value indicating an electronic mail message; and
a value indicating an instant message.

* * * * *